March 17, 1942.  C. G. BROSTROM  2,276,461
INSEAM TRIMMING MACHINE
Filed April 9, 1940  2 Sheets-Sheet 1

INVENTOR
Charles G. Brostrom
By his Attorney
Victor Cobb.

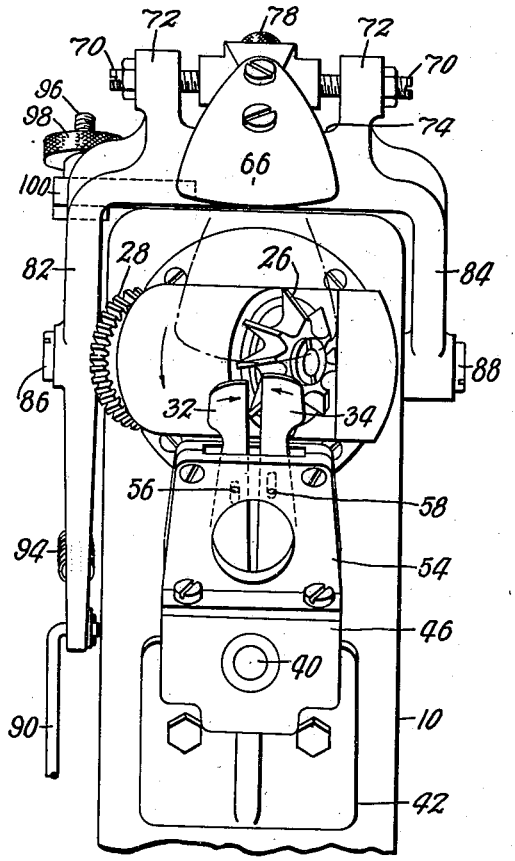

Patented Mar. 17, 1942

2,276,461

UNITED STATES PATENT OFFICE 2,276,461

INSEAM TRIMMING MACHINE

Charles Gustave Brostrom, Salem, Mass., assignor to United Shoe Machinery Corporation, Borough of Flemington, N. J., a corporation of New Jersey Application April 9, 1940, Serial No. 328,703

16 Claims. (Cl. 12—82)

This invention relates to trimming machines and is illustrated as embodied in a machine for trimming surplus rib materials from the inseam at the bottom of a lasted shoe, such machines being commonly known as inseam trimmers.

In order properly to prepare the bottom of a lasted shoe for the application of the outsole, the surplus materials extending from the inseam should be trimmed close to the inseam and as evenly as possible. In certain present day machines used for this purpose in which the cutting surfaces of the trimmer move in one direction only across the rib to be trimmed, a certain amount of the surplus materials is often left protruding from the edge of the rib, thus leaving a frayed or feathery edge. When the edge of the trimmed rib is frayed, the bottom of the shoe is not in the ideal condition for the attachment of the outsole.

Accordingly, it is an object of my invention to provide a trimming machine which will trim the work evenly and leave no frayed edges at the completion of the trimming operation.

As a feature of the invention, the trimming cutter is arranged to engage the material to be trimmed from various directions to avoid the formation of any frayed edges at the conclusion of the trimming operation.

In the illustrated machine the cutter is provided with conically arranged cutting surfaces, the cutter being mounted for rotation about the axis of the cone and for whirling motion about an axis intersecting the axis of rotation of the cutter and perpendicular to the work-engaging part of the cutter, the cutter being moved simultaneously about both axes so that the various cutting surfaces will move across the work being trimmed from different directions.

In accordance with another feature of the invention the work is fed by the feeding means in a step-by-step manner so that the work will pause long enough between successive feeding steps to insure that each portion of the work to be trimmed is engaged by the cutter from various different directions.

These and other features of the invention will now be described in the specification and illustrated in the drawings, in which—

Fig. 3 is a front elevation of the operating head of the machine;

Fig. 4 is a front view, partly in section, of the feeding mechanism in a different position from that of Fig. 3 illustrating a piece of work held in engagement therewith by the presser foot; and Fig. 5 is a diagrammatic view illustrating the various angles at which the blades of the cutter approach the work.

Figure 2:
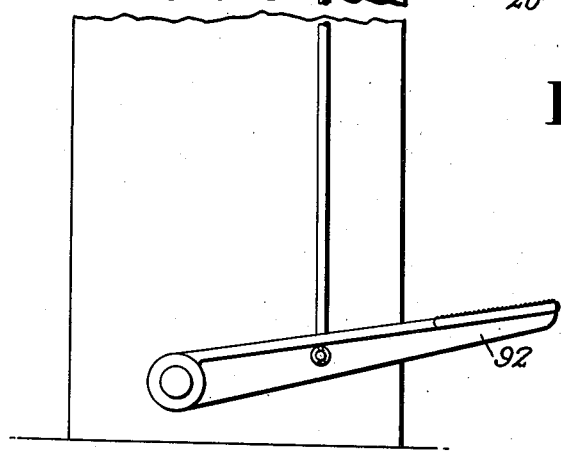
Fig. 2 is an enlarged fragmentary view, partly in section, of a portion of the machine, showing a piece of work in process of being trimmed thereby.

The machine is illustrated as being provided with a column 10 in the upper end of which is journaled a shaft 12 carrying at its rearward end a pulley 14. This pulley is connected by a belt 16, a countershaft 18, and a belt 20 with a suitable driving means. The shaft 12 is inclined slightly downwardly toward the front of the machine and to its forward end is supported a tool carrier 22. A spindle 24 is journaled in the tool carrier 22 and carries at its outer end a cutter 26 having a plurality of cutting blades the edges of which are conically disposed with respect to the axis of the spindle. The rearward end of the spindle 24 carries a planet gear 28 meshing with a stationary sun gear 30 concentric with and surrounding the drive shaft 12. Thus as the drive shaft 12 is rotated to rotate the tool carrier 22, the planet gear 28 will roll around the stationary gear 30 to rotate the spindle 24 about its own axis. The spindle 24 is so arranged within the tool carrier 22 that the work-engaging portion of the cutter 26 is disposed perpendicularly to the axis of the drive shaft 12, this axis intersecting the axis of the spindle 24. Accordingly, as the tool carrier 22 is rotated the cutter 26 rotates about its own axis and whirls about the axis of the drive shaft 12 with the cutters progressively moving through a common plane in which the work is trimmed from various angles. In Fig. 2, one position of the cutter is shown by full lines, and the position of the cutter after the carrier 22 has rotated through 180° is represented by broken lines.

Figure 1:
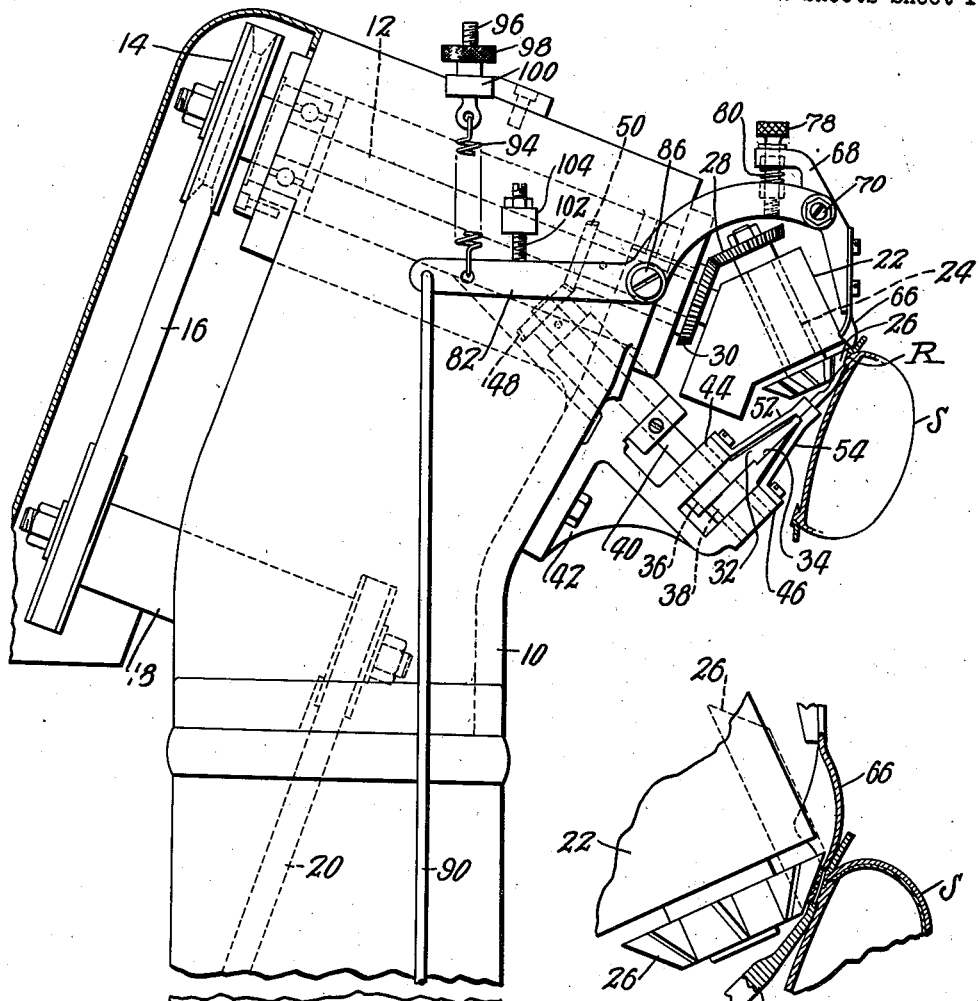
Fig. 1 is a side elevation of one form of machine in which the invention is embodied.

In order to feed the work such as a lasted shoe S with the rib R of surplus materials in contact with the work-engaging portion of the cutter 26, a pair of feed dogs 32 and 34 (Figs. 3 and 4) are provided. The upper work-engaging portions of the feed dogs are arranged to be oscillated alternately to impart a step-by-step feed to the work. For this purpose, the lower ends of the feed dogs are mounted on eccentrics 36 and 38 at the lower end of the drive shaft 40. The drive shaft 40 is journaled in a bracket 42 fixed to the front of the column 10 near the upper end thereof. The bracket 42 has upwardly extending arms 44 and 46 between which the lower ends of the feed dogs are mounted on their respective eccentrics and held against endwise movement on the shaft 40. The rearward end of the shaft 40 carries a gear 48 which is driven from a gear 50 mounted on the drive shaft 12. Plates 52 and 54 secured to the upper ends of the arms 44 and 46 enclose all but the upper portions of the feed dogs. Pins 56 and 58 (Figs. 3 and 4) pass between the upper ends of the plates 52 and 54 and through slots 60 and 62 in the feed dogs 32 and 34 respectively. Accordingly, as the shaft 40 is rotated, the eccentrics on which the feed dogs are mounted impart an oscillatory motion to the feed dogs, the path of which is substantially elliptical as indicated by the dotted lines of Fig. 4. Since the eccentrics 36 and 38 are staggered 180° the feed dogs will engage the work alternately and impart an intermittent or step-by-step feeding movement to the work. As indicated in Figs. 1 and 2, the feed dogs engage the inner side of the rib extending from the bottom of the lasted shoe at the inseam.

In order to guide the work as it is fed by the dogs 32 and 34 and hold the inner edge of the rib extending from the bottom of the shoe in engagement with the feed dogs, a presser foot or guide 66 is arranged to engage the outer side of the rib adjacent to the line of stitching of the inseam. This guide is spring-biased downwardly and inwardly toward the cutter 26 to maintain the work in proper engagement therewith. The guide is secured to the lower end of an arm 68 which is pivoted by means of screws 70 (Fig. 3) threaded through spaced ears 72 extending forwardly from an arm 74 transversely mounted above the tool carrier 22. The arm 68 has a rearwardly extending portion through which passes a screw 78 threaded into the arm 74. A compression spring 80 surrounding the screw 78 acts between the arm 74 and the rearward extension of the arm 68 to urge the arm 68 in a clockwise direction as viewed in Fig. 1 to hold the guide 66 downwardly and inwardly toward the cutter 26. The lower end of the guide is curved as indicated in Figs. 1 and 2 to avoid interference with the cutter 26. The extent of movement of the guide 66 toward the cutter is limited by the position of the screw 78 the head of which forms a stop for the movement of the arm 68 by the spring 80.

In order to facilitate the positioning of the work between the feed dogs and the guide 66 and against the cutter 26, provision is made for raising the guide from its normal operating position. For this purpose the transversely extending arm 74 carrying the guide supporting arm 68 is provided with rearwardly extending arms 82 and 84 (Fig. 3) pivoted by screws 86 and 88 to the upper portion of the machine. The arm 82 is extended rearwardly beyond the pivot screw 86 and the rearward end of this arm is connected by a treadle rod 90 to a treadle 92 pivoted to the lower end of the machine. A spring 94 is connected to the arm 82 adjacent to the rear end thereof, the upper end of the spring being connected to a screw 96 adjustably secured by a nut 98 to a bracket 100 fixed to the top of the machine. Movement of the arm 82 by the spring 94 is limited by a stop screw 102 threaded through a bracket 104 extending laterally from the upper end of the machine. It will be apparent that as the operator steps upon the treadle 92, the arm 82 will be moved in a counterclockwise direction against the force exerted by the spring 94 to move the guide 66 upwardly away from the feed dogs thus enabling presentation of the work to the machine.

Fig. 5 indicates graphically the directions of movements of the different blades of the cutter as they pass over the rib being trimmed, the blades engaging the rib from different directions by reason of the whirling movement imparted to the tool carrier during the rotation of the cutter. It should be understood that each blade of the cutter will engage every portion of the rib being trimmed successively so that every portion thereof is actually trimmed from eight different directions. This is due to the intermittent feeding movement imparted to the work by the feed dogs 32 and 34 which permits the work to remain at rest long enough for each portion thereof to be engaged by all the blades of the cutter, thus causing each portion of the work to be trimmed from many different directions so that the rib will be cleanly trimmed to provide an unfrayed, flat-surfaced inseam.

Having thus described my invention, what I claim as new and desire to secure by Letters Patent of the United States is:

1. A trimming machine comprising a rotatable cutter having a plurality of straight cutting edges, means for feeding a lasted shoe past said cutter with the surplus material of the rib on the bottom of said shoe in engagement with said cutter, and means for operating said cutter so that each of said cutting edges moves across the rib in a direction different from that of each of the other cutting edges.

2. A trimming machine comprising a rotatable cutter having conically arranged cutting surfaces, said tool being mounted for rotation about the axis of the cone and for whirling movement about an axis normal to the operating face thereof and intersecting the operating face and the axis of rotation, and means for rotating and whirling the tool simultaneously about said axes.

3. In a trimming machine, a rotatable shaft, a tool carrier mounted upon said shaft, a trimming cutter having conically arranged cutting surfaces, said cutter being journaled to rotate in the carrier, the axis of the conical cutter intersecting the axis of the shaft obliquely, and the axis of the shaft intersecting the conical work-engaging surface of the tool at right angles.

4. In a trimming machine, a rotatable shaft, a tool carrier mounted upon said shaft, a stationary sun gear encircling the shaft, a tool spindle journaled to rotate in said carrier, the axis of said spindle intersecting the axis of said shaft adjacent to the tool carrying end of the spindle, a trimming cutter fixed to said spindle, said cutter having conically arranged cutting surfaces, a planet gear fixed to said spindle and in mesh with the sun gear, and means for rotating the shaft about its axis.

5. In a machine for trimming the surplus material of a rib on the bottom of a lasted shoe, a rotatable cutter, means engaging the inside of the rib for feeding the work past said cutter, a presser foot arranged to engage the outside of said rib to hold the rib against the feeding means, and means for operating said cutter to cause each portion of the rib to be engaged thereby from several different directions.

6. In a machine for trimming the surplus material of a rib on the bottom of a lasted shoe, a rotatable cutter, a pair of alternately oscillatable feed dogs arranged to engage the inside of the rib for feeding the same intermittently past said cutter, and means for operating said cutter to cause each portion of the rib to be engaged thereby from several different directions.

7. In a machine for trimming the surplus material of a rib on the bottom of a lasted shoe, a rotatable cutter, a pair of alternately oscillatable feed dogs arranged to engage the inside of the rib for feeding the same intermittently by said cutter, a guide arranged to engage the outside of the rib and spring-biased toward said feed dogs, operator controlled means for moving said guide away from said feed dogs, and means for operating said cutter to cause each portion of the rib to be engaged thereby from several different directions.

8. In a machine for trimming the surplus material of a rib on the bottom of a lasted shoe, a rotatable cutter having conically arranged cutting surfaces, the work-engaging portion of said cutter being in a nearly vertical plane, feeding means arranged to engage the inside of the rib to be trimmed for feeding it past said cutter, said feeding means being located below the operating portion of said cutter, a guide arranged to engage the outside of the rib and urge the rib into engagement with the feeding means, and means for rotating said cutter about its axis and whirling the cutter about an axis perpendicular to the operating face of the cutter and intersecting the axis of rotation of the cutter.

9. In an inseam trimming machine, the combination of a trimming tool arranged to rotate and to whirl about respective angularly related intersecting axes, said tool having a plurality of cutting edges which move through a common plane in different directions, means for driving the tool simultaneously about the two axes, and means for feeding a shoe to be trimmed past said trimming tool with the portion to be trimmed passing through said plane to be acted on progressively from different directions.

10. In a trimming machine, a cutter having conically arranged cutting surfaces, said cutter being mounted for rotation about its axis and for whirling movement about an axis normal to the operating face and intersecting the axis of rotation thereof adjacent to said operating face, means for driving the tool simultaneously about both axes, and means for intermittently feeding the work to be trimmed past the operating face of the cutter.

11. In an inseam trimming machine, the combination of a trimming tool arranged to rotate and to revolve about respective angularly related axes, said tool having a plurality of cutting edges which move through a common plane in different directions, means for driving the tool simultaneously about the two axes, and means for intermittently feeding a shoe to be trimmed past said trimming tool with the portion to be trimmed passing through said plane to be acted on progressively from different directions.

12. In a machine for trimming the surplus material of a rib on the bottom of a lasted shoe, a pair of alternately oscillatable feed dogs arranged to engage the inside of the rib for feeding the same intermittently, a trimming tool arranged to rotate and to revolve about respective angularly related axes in engagement with the work, and means for driving said dogs and said cutter.

13. In a machine for trimming the surplus material of a rib on the bottom of a lasted shoe, the combination of a trimming tool arranged to rotate and to revolve about respective angularly related axes, means for driving the tool simultaneously about the two axes, a pair of alternately oscillatable feed dogs arranged to engage the inside of the rib for feeding the same intermittently past said trimming tool, a guide arranged to engage the outside of the rib and spring-biased toward said feed dogs to hold the rib in engagement with the feed dogs for the operation of said trimming tool, and operator controlled means for moving said guide away from said feed dogs.

14. The method of trimming inseams on the bottom of lasted shoes which comprises maintaining the portion to be trimmed in engagement with a rotatable trimming cutter, feeding the work by said cutter while in engagement therewith, rotating the cutter, and simultaneously moving the cutter bodily whereby the cutter progressively engages the work from different directions to trim the work evenly and leave no frayed edges.

15. The method of trimming inseams from the bottom of lasted shoes which comprises maintaining the work in engagement with a rotatable trimming cutter, imparting an intermittent feeding movement to the work while in engagement with the cutter, rotating the cutter, and simultaneously moving the cutter bodily about an axis angularly related to the axis of rotation of the cutter to cause each portion of the work to be engaged by the cutter from various different directions between each feeding movement thereof to trim the work evenly and leave no frayed edges.

16. The method of trimming inseams from the bottom of lasted shoes which comprises maintaining the inseam portion of a shoe in engagement with a rotatable trimming cutter, feeding the shoe intermittently while in engagement with the cutter, rotating the cutter, and simultaneously moving the cutter bodily so that each cutting surface of the cutter will engage the work from a different direction, and causing the cutter to move at a sufficiently high speed that each portion of the work wil be engaged by all the cutting surfaces of the cutter to trim the work evenly and leave no frayed edges.

CHARLES GUSTAVE BROSTROM.